United States Patent
Kwon et al.

(10) Patent No.: US 11,853,419 B2
(45) Date of Patent: Dec. 26, 2023

(54) APPARATUS AND METHOD FOR PREVENTING SIDE CHANNEL ATTACK FOR NTRU LPRIME ALGORITHM

(71) Applicants: SAMSUNG SDS CO., LTD., Seoul (KR); Kookmin University Industry Academy Cooperation Foundation, Seoul (KR)

(72) Inventors: Ji Hoon Kwon, Seoul (KR); Joo Hee Lee, Seoul (KR); Hyo Jin Yoon, Seoul (KR); Ji Hoon Cho, Seoul (KR); Dong Guk Han, Seoul (KR); Bo Yeon Sim, Gyeonggi-do (KR); Il Ju Kim, Jeollanam-do (KR); Tae Ho Lee, Seoul (KR); Jae Seung Han, Gyeonggi-do (KR)

(73) Assignees: SAMSUNG SDS CO., LTD., Seoul (KR); Kookmin University Industry Academy Cooperation Foundation, Seoul (KR)

( * ) Notice: Subject to any disclaimer, the term of this patent is extended or adjusted under 35 U.S.C. 154(b) by 129 days.

(21) Appl. No.: 17/081,810

(22) Filed: Feb. 1, 2021

(65) Prior Publication Data
US 2022/0129547 A1    Apr. 28, 2022

(30) Foreign Application Priority Data
Oct. 26, 2020   (KR) .......................... 10-2020-0139186

(51) Int. Cl.
*G06F 21/55*    (2013.01)
*G06F 7/58*    (2006.01)
(Continued)

(52) U.S. Cl.
CPC ............ *G06F 21/556* (2013.01); *G06F 7/588* (2013.01); *G06F 21/54* (2013.01); *G06F 21/602* (2013.01)

(58) Field of Classification Search
CPC ........ G06F 21/556; G06F 7/588; G06F 21/54; G06F 21/602
See application file for complete search history.

(56) References Cited

U.S. PATENT DOCUMENTS 10,795,858 B1 * 10/2020 Schmitt ............... G06F 16/1744
2004/0078570 A1 * 4/2004 Geiringer ............... H04L 9/002
380/46

(Continued)

OTHER PUBLICATIONS

An, Soojung, Suhri Kim, Sunghyun Jin, HanBit Kim, and HeeSeok Kim. 2018. "Single Trace Side Channel Analysis on NTRU Implementation" Applied Sciences 8, No. 11: 2014. (Year: 2018).*

(Continued)

*Primary Examiner* — Alexander Lagor
*Assistant Examiner* — Zoha Piyadehghibi Tafaghodi
(74) *Attorney, Agent, or Firm* — The PL Law Group, PLLC (57) ABSTRACT

A method for preventing side-channel attack according to an embodiment includes generating an order table which includes a position index value for each bit value of a bit string that is secret information to be generated through a decryption algorithm of an $N^{th}$ Degree Truncated Polynomial Ring Units (NTRU) LPRime algorithm, shuffling a sort order of the position index value for the each bit value in the order table based on a random number, determining a generation order for the each bit value according to the sort order of the position index value for the each bit value in the order table, and generating the secret information through the decryption algorithm. The secret information is gener- (Continued)

ated by generating the each bit value according to the determined generation order.

8 Claims, 7 Drawing Sheets

(51) Int. Cl.
*G06F 21/60* (2013.01)
*G06F 21/54* (2013.01)

(56) References Cited

U.S. PATENT DOCUMENTS

| 2018/0316487 | A1* | 11/2018 | Choi | H04L 9/003 |
| 2019/0079878 | A1* | 3/2019 | Chen | H04L 9/0866 |
| 2020/0082738 | A1* | 3/2020 | Poeppelmann | H04L 9/002 |
| 2020/0304305 | A1* | 9/2020 | Garcia Morchon | H04L 63/061 |
| 2020/0313886 | A1* | 10/2020 | Poeppelmann | H04L 9/3236 |

OTHER PUBLICATIONS

Akleylek, S., et al., "Fast NTRU Encryption in GPU for Secure IoP Communication in Post-Quantum Era," 2018 IEEE SmartWorld, Ubiquitous Intelligence & Computing, Advanced & Trusted Computing, Scalable Computing & Communications, Internet of People and Smart City Innovation, pp. 1923-1928 (Year: 2018).*

Daniel J. Bernsteinet al., "NTRU Prime: round 2", (Mar. 9, 2019). See the entire document.

* cited by examiner

| | |
|---|---|
| In | Keys (sk, pk, $\rho$), ciphertext $C = (\bar{c}, r)$ |
| Out | Shared key $K \in \{0, 1\}^l$ |
| 1: | $a = SmallDecode(\mathbf{sk})$ |
| 2: | $B = RoundedDecode(\bar{c})$ |
| 3: | $T = TopDecode(\bar{c})$ |
| 4: | /* Decryption */ |
| 5: | $tmp = (Right(T) - (aB) + 4w + 1) \mod q$ |
| 6: | $r' = decrypt(tmp)$ |
| 7: | /* Shared Key Derivation */ |
| 8: | $C', \vec{r'} = Hide(r', \mathbf{pk}, Hash(4 \parallel \mathbf{pk}))$ |
| 9: | if $(C' = C), K = Hash(1 \parallel \vec{r'} \parallel C)$ |
| 10: | else $K = Hash(0 \parallel \rho \parallel C)$ |
| 11: | Return $K$ |

FIG. 5

```
/* r' = Decrypt((B,T),a) */
static void Decrypt(int8 *r, const Fq *B, const int8 *T, const small *a)
{
    Fq aB[p];
    int i;

Rq_mult_small (aB,B,a);
    for ( i = 0; i <L; ++ i)
        r' [i] = -int16_negative_mask(r'[i]);
}
```

FIG. 6

```
/* return -1 if x <0; otherwise return 0 */
Static int int16_negative_mask(int16 x) {
    uint16 u=x;
    u >>= 15;
    return ?(int) u;
}
```

FIG. 7

```
static void Decrypt(int8 *r, const Fq *B, const int8 *T, const small *a) {
  Fq aB[p];
  int I, j, tmp ;
  unsinged int8 table[256];

Rq_mult_small(aB,B,a) ;
  for(i = 0; i < l; i++)                                              ⎫
                                                                      ⎬ 710
    table[i] = i;                                                     ⎭
  for( i = l-1; i > 0; i--) { // for loop to shuffle
    j = randombyte() % (i+1); // randomize j for shuffle
    tmp = table[i]; // swap i-th and j-th elements
    table[j] = table[i];
    table[i] = tmp;
  }
  for (i = 0; i < l; ++ i) {                                          ⎫
    b = table [i];                                                    ⎬ 720
    r'[b] = -int16_negative_mask(r[b]);                               ⎭
  }
}
```

APPARATUS AND METHOD FOR PREVENTING SIDE CHANNEL ATTACK FOR NTRU LPRIME ALGORITHM

CROSS REFERENCE TO RELATED APPLICATIONS AND CLAIM OF PRIORITY

This application claims the benefit of Korean Patent Application Nos. 10-2020-0139186 filed on Oct. 26, 2020 in the Korean Intellectual Property Office, the disclosure of which is incorporated herein by reference in its entirety.

BACKGROUND

Technical Field

Disclosed embodiments relate to a technique for preventing side-channel attacks.

Background Art of the Invention

The National Institute of Standards and Technology (NIST) has launched a call for proposals for Post Quantum Cryptography (PQC) standardization since 2016, and announced a total of 26 algorithms including an $N^{th}$ Degree Truncated Polynomial Ring Units (NTRU) LPRime algorithm as candidates for the second round of the call on Jan. 30, 2019.

As the security against side-channel analysis was included in the selection criteria for the second round, an implementation result that is secure against simple power analysis (SPA), which is the most well-known among the side-channel analysis techniques, was submitted to NIST. However, although the scheme is secure against the simple power analysis, it is still vulnerable to a single trace attack, which is a powerful side-channel analysis technique that derives secret information using a single trace. Therefore, it is required to design a countermeasure technique against such attacks.

SUMMARY

Disclosed embodiments are intended to provide an apparatus and method for preventing side-channel attack on the $N^{th}$ Degree Truncated Polynomial Ring Units (NTRU) LPRime algorithm.

A method for preventing side-channel attack according to an embodiment includes: generating an order table which includes a position index value for each bit value of a bit string that is secret information to be generated through a decryption algorithm of an NTRU LPRime algorithm; shuffling a sort order of the position index value for the each bit value in the order table based on a random number; determining a generation order for the each bit value according to the sort order of the position index value for the each bit value in the order table; and generating the secret information through the decryption algorithm, wherein the secret information is generated by generating the each bit value according to the determined generation order.

The shuffling may include generating a random number $R_i$ (here, $R_i$ is an integer satisfying $0 \leq Ri$) for an i-th position index value included in the order table (here, i is the sort order and an integer number satisfying $1 \leq i \leq L-1$ and L is a length of the bit string), selecting a $j^{th}$ position index value (here j is an integer satisfying $0 \leq j \leq i$) in the order table based on the i and the random number $R_i$, and swapping the sort orders of the $i^{th}$ position index value and the $j^{th}$ position index value in the order table.

The generating of the order table may include generating the order table in which the position index values for the each bit value are arranged according to an order of corresponding positions in the bit string.

The selecting may include selecting the $j^{th}$ position index value based on Equation 1 below:

$$j = R_i \bmod (i+1). \quad \text{[Equation 1]}$$

An apparatus for preventing side-channel attack according to an embodiment includes: a memory storing one or more commands; and one or more processors configured to execute the one or more commands, wherein the one or more processors perform operations comprising: generating an order table which includes position index values for each bit value of a bit string that is secret information to be generated through a decryption algorithm of an NTRU LPRime algorithm, shuffling a sort order of the position index value for the each bit value in the order table based on a random number, determining a generation order for the each bit value according to the sort order of the position index value for the each bit value in the order table, and generating the secret information through the decryption algorithm, wherein the secret information is generated by generating the each bit value according to the determined generation order.

The shuffling may include generating a random number $R_i$ (here, $R_i$ is an integer satisfying $0 \leq Ri$) for an $i^{th}$ position index value included in the order table (where i is the sort order and an integer number satisfying $1 \leq i \leq L-1$ and L is a length of the bit string), selecting a $j^{th}$ position index value (where j is an integer satisfying $0 \leq j \leq i$) in the order table based on the i and the random number $R_i$, and swapping the sort orders of the $i^{th}$ position index value and the $j^{th}$ position index value in the order table.

The generating of the order table may include generating the order table in which the position index values for the each bit value are arranged according to an order of corresponding positions in the bit string.

The selecting may include selecting the $j^{th}$ position index value based on Equation 1 below:

$$j = R_i \bmod (i+1) \quad \text{[Equation 1]}$$

According to the disclosed embodiments, attack complexity of a single-trace attack for obtaining secret information generated through a decryption process of the NTRU LPRime algorithm is increased, thereby preventing the acquisition of secret information by a single-trace attack.

DETAILED DESCRIPTION

Hereinafter, specific exemplary embodiments of the present disclosure will be described with reference to the drawings. The following detailed description is provided to assist in comprehensive understanding of methods, apparatuses, and/or systems described herein. However, this is merely an example, and the present disclosure is not limited thereto.

When detailed description of known art related to the present disclosure is determined to unnecessarily obscure the subject matter of the present disclosure in describing exemplary embodiments of the present disclosure, the detailed description will be omitted. The terms to be described below are terms defined in consideration of functions in the present disclosure and may be changed according to an intention of a user or an operator or practice. Therefore, definitions thereof will be determined based on content of the entire specification. The terms used in the detailed description are merely intended to describe the exemplary embodiments of the present disclosure and should not be limited in any way. The singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, operations, operations, elements, and/or components, but do not preclude the presence or addition of one or more other features, integers, operations, operations, elements, components, and/or groups thereof.

Figure 1:
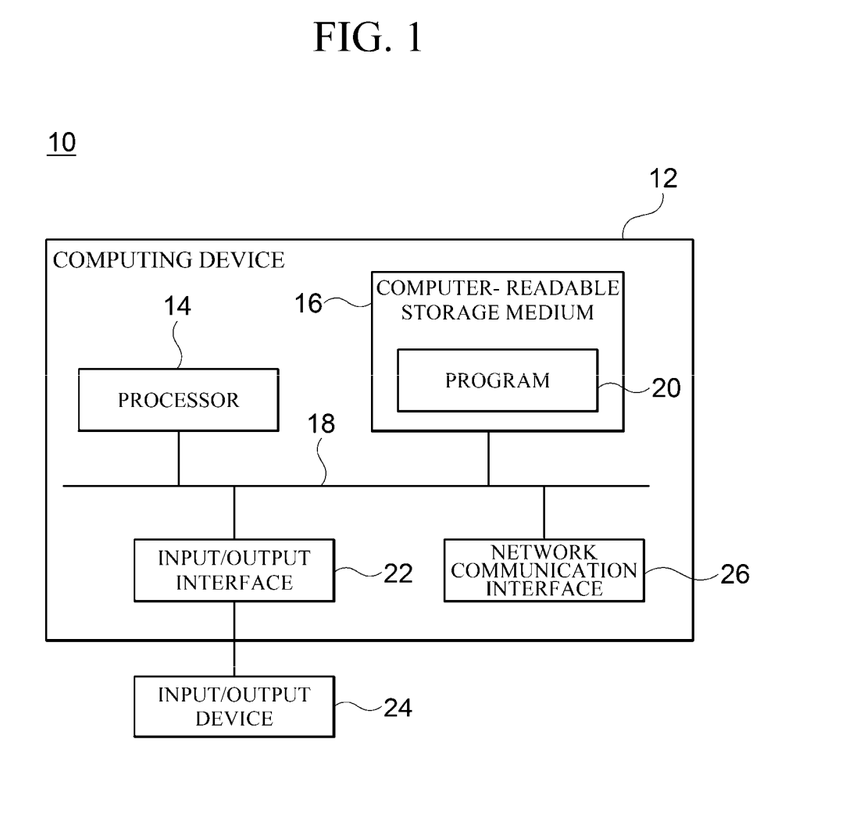
FIG. 1 is a block diagram illustrating an example of a computing environment including a computing device according to an embodiment.

FIG. 1 is a block diagram illustrating an example of a computing environment including a computing device according to an embodiment; In the illustrated embodiment, each of the components may have functions and capabilities different from those described hereinafter and additional components may be included in addition to the components described herein.

The illustrated computing environment 10 includes a computing device 12. The computing device 12 may be one or more components included in an apparatus for performing a method of preventing side-channel attacks according to an embodiment.

The computing device 12 includes at least one processor 14, a computer-readable storage medium 16, and a communication bus 18. The processor 14 may cause the computing device 12 to operate according to the above-described exemplary embodiment. For example, the processor 14 may execute one or more programs stored in the computer-readable storage medium 16. The one or more programs may include one or more computer executable instructions, and the computer executable instructions may be configured to, when executed by the processor 14, cause the computing device 12 to perform operations according to an exemplary embodiment.

The computer-readable storage medium 16 is configured to store computer executable instructions and program codes, program data and/or information in other suitable forms. The programs stored in the computer-readable storage medium 16 may include a set of instructions executable by the processor 14. In one embodiment, the computer-readable storage medium 16 may be a memory (volatile memory, such as random access memory (RAM), non-volatile memory, or a combination thereof) one or more magnetic disk storage devices, optical disk storage devices, flash memory devices, storage media in other forms capable of being accessed by the computing device 12 and storing desired information, or a combination thereof.

The communication bus 18 connects various other components of the computing device 12 including the processor 14 and the computer readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24 which is one component constituting the computing device 12 may be included inside the computing device 12 or may be configured as a separate device from the computing device 12 and connected to the computing device 12.

Figure 2:
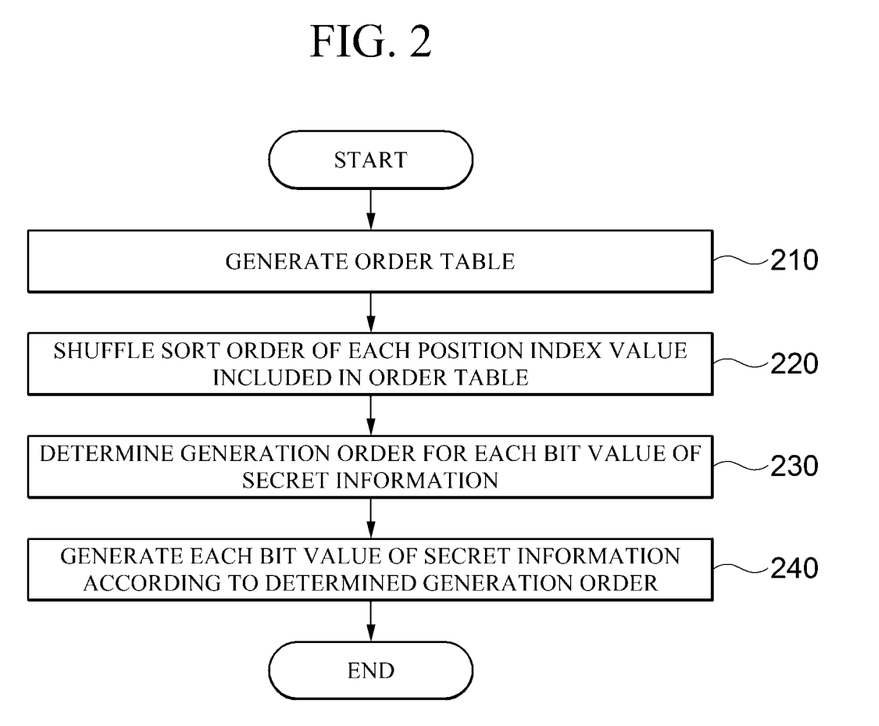
FIG. 2 is a flowchart illustrating a method of defending against side-channel attacks according to an embodiment.

FIG. 2 is a flowchart illustrating a method of defending against side-channel attacks according to an embodiment.

The method shown in FIG. 2 may be performed, for example, by the computing device 12 shown in FIG. 1.

Referring to FIG. 2, first, the computing device 12 generates an order table that includes a position index value of each bit value of a bit string that is secret information to be generated through an $N^{th}$ degree truncated polynomial ring units (NTRU) LPRime algorithm's decryption algorithm (hereinafter, referred to as a "decryption algorithm").

According to an embodiment, when the secret information to be generated through the decryption algorithm is a bit string of L (here, L is an integer greater than 1) bits, the position index value of each of the L bit values constituting the bit string may mean information indicating a position of each bit value in the bit string.

For example, assuming that the secret information is a 4-bit bit string $r=(r_0, r_1, r_3, r_4) \in \{0,1\}$, a position index value of "$r_0$," the first bit value of the bit string r, may be "0," a position index value of "$r_1$," the second bit value, may be "1," a position index value of "$r_2$," the third bit value, may be "2," and a position index value of "$r_3$," the fourth bit value, may be "3". However, the position index values are not necessarily limited to the above examples, and various values that can be used to identify a specific position in the bit string may be used as the position index values.

Meanwhile, according to an embodiment, the position index values included in the order table may be arranged in the order of corresponding positions in the bit string. Specifically, as in the above-described example, assuming that the secret information is a bit string $r=(r_0, r_1, r_3, r_4)$, the computing device 12 may generate, for example, an order table as shown in Table 1 below.

TABLE 1

| Order | 0 | 1 | 2 | 3 | 4 |
|---|---|---|---|---|---|
| Index | 0 | 1 | 2 | 3 | 4 |

Specifically, in the order table shown in Table 1, each value in the "Index" row represents a position index value of each bit value included in the bit string r, and each value in the "Order" row represents an order index value indicating the order of each index value sorted in the order table.

Thereafter, the computing device 12 shuffles the sort orders of the position index values in the order table based on a random number (220).

Thereafter, the computing device 12 determines a generation order for each bit value of secret information to be generated through a decryption algorithm according to the sort order of each position index value in the order table determined through shuffling (230).

Thereafter, the computing device 12 generates secret information using the decryption algorithm, and generates each bit value of the secret information according to the generation order determined in operation 230 (240).

For example, when the position index values included in the order table of Table 1 described above are shuffled as shown in an order table shown in Table 2 below, the computing device 12 may generate the bit values of the secret information in the order of $r_4$, $r_1$, $r_3$, $r_2$, and $r_0$.

TABLE 2

| Order | 0 | 1 | 2 | 3 | 4 |
|---|---|---|---|---|---|
| Index | 4 | 1 | 3 | 2 | 0 |

Figure 3:
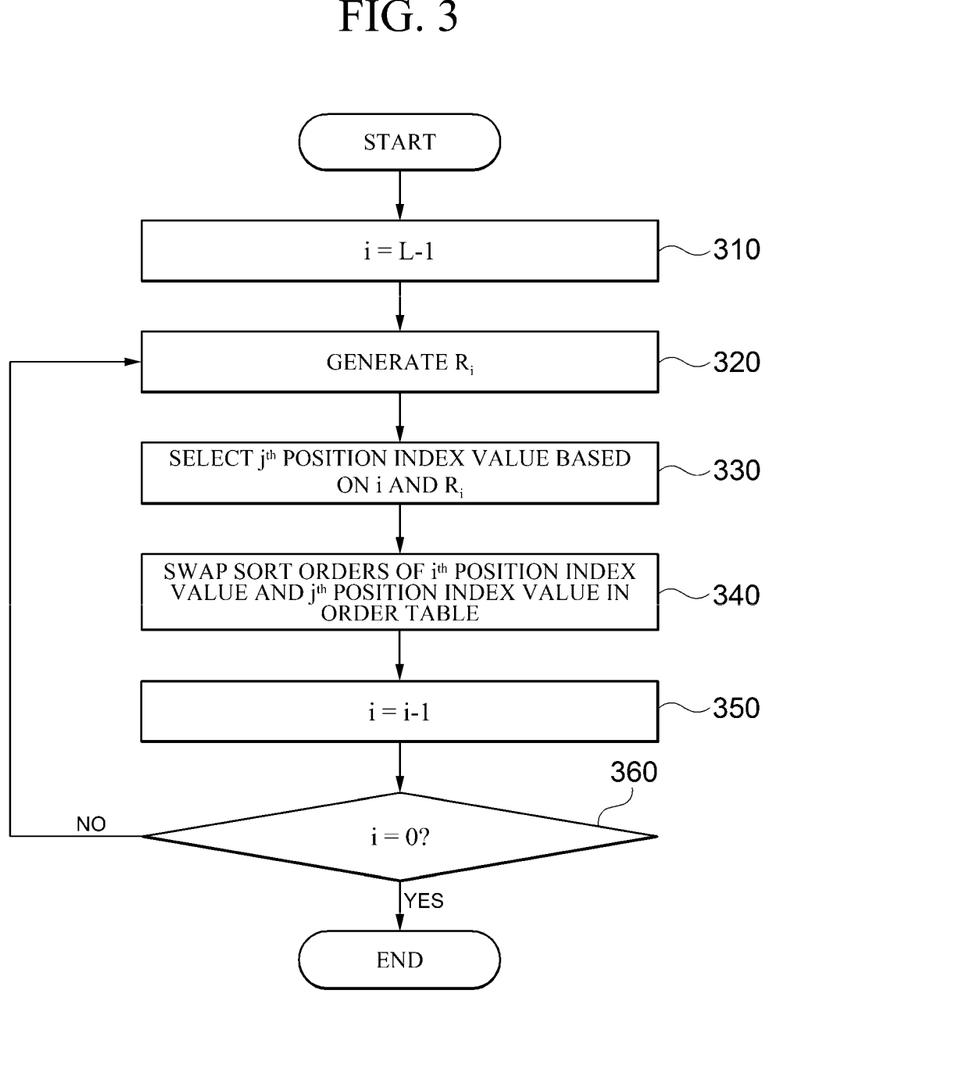
FIG. 3 is a diagram illustrating a shuffling process according to an embodiment.

FIG. 3 is a diagram illustrating a shuffling process according to an embodiment.

The shuffling process shown in FIG. 3 may be performed, for example, in operation 220 shown in FIG. 2.

First, the computing device 12 initializes an order index value i that indicates the sort order of each position index value included in the order table to i=L−1 (310).

Thereafter, the computing device 12 generates a random number $R_i$ (where $R_i$ is an integer satisfying $0 \le R_i$) (320).

Thereafter, the computing device 12 selects a position index value whose order index value in the order table is j (here, j is an integer satisfying $0 \le j \le i$) based on the order index value i and the random number $R_i$ (330).

In this case, according to an embodiment, the computing device 12 may determine the order index value j using Equation 1 below.

$$j = R_i \bmod (i+1)$$ [Equation 1]

Thereafter, the computing device 12 swaps the sort order of the $i^{th}$ position index value and the $j^{th}$ position index value in the order table (340).

For example, assuming that the order table is the same as Table 1, i=4, and j=1, the computing device 12 may change the sort order of the fourth index value, "4" and the first index value "1" in the order table, and accordingly, the order table shown in Table 1 may be changed as shown in Table 3 below.

TABLE 3

| Order | 0 | 1 | 2 | 3 | 4 |
|---|---|---|---|---|---|
| Index | 0 | 4 | 2 | 3 | 1 |

Thereafter, the computing device 12 decreases the order index value i by 1 (350), and then determines whether i=0 (360).

In this case, when i>0, the computing device 12 repeats operations 310 to 360 until i=0 is satisfied, and when i=0, the computing device 12 terminates the shuffling process.

Figure 4:
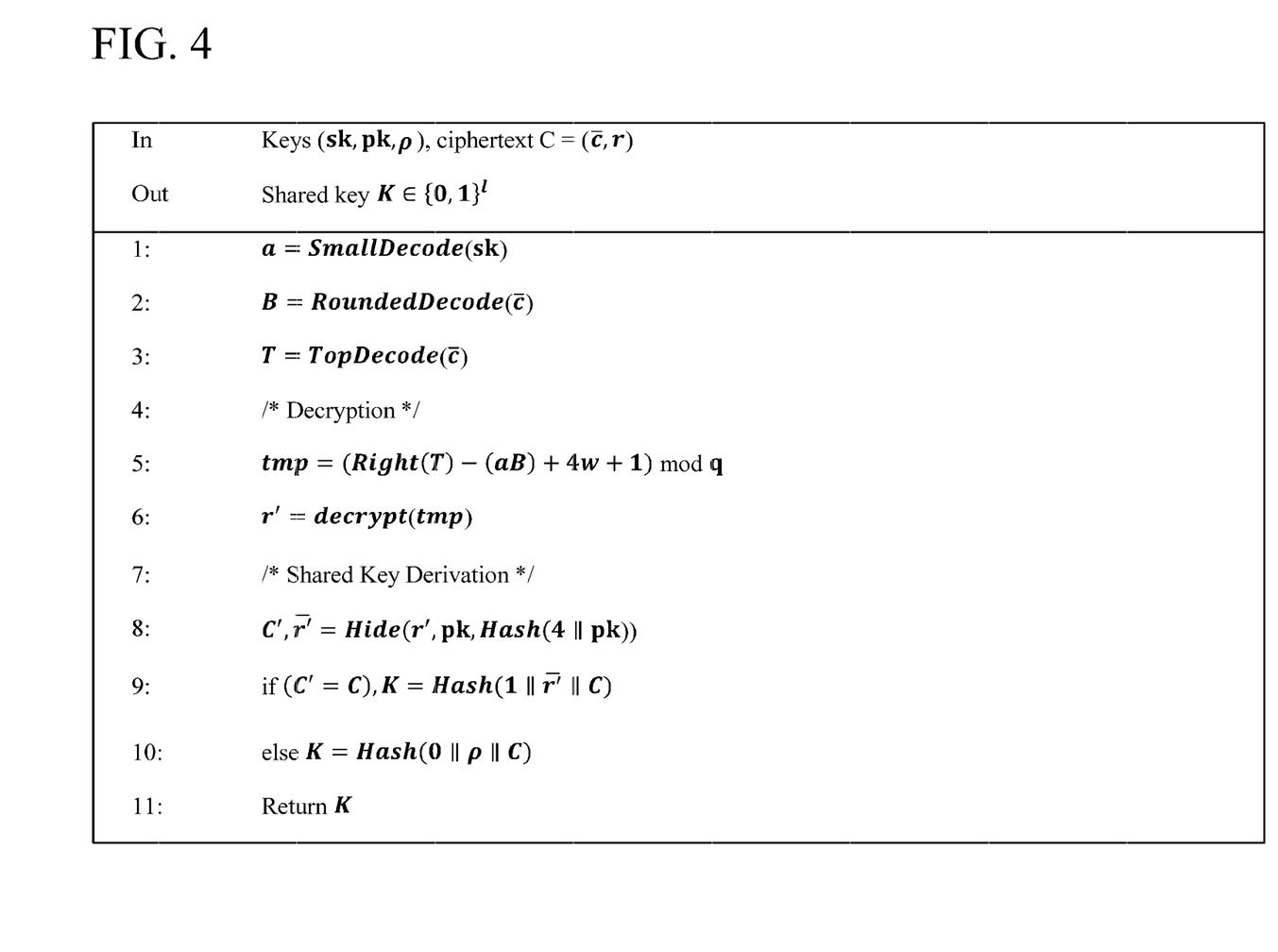
FIG. 4 is a diagram showing a pseudo-code of a decapsulation algorithm of the $N^{th}$ degree Truncated polynomial Ring Units (NTRU) LPRime algorithm.

FIG. 4 is a diagram showing a pseudo-code of a decapsulation algorithm of the NTRU LPRime algorithm.

Referring to the pseudo-code shown in FIG. 4, processes described in the $5^{th}$ and $6^{th}$ lines of the pseudo-code are the processes in which the decryption algorithm is performed, and Right function represents a function predefined as Right: $\mathbb{Z}/\tau \rightarrow \mathbb{Z}/q$ (where q is a prime number) by a positive integer $\tau$.

Figure 5:
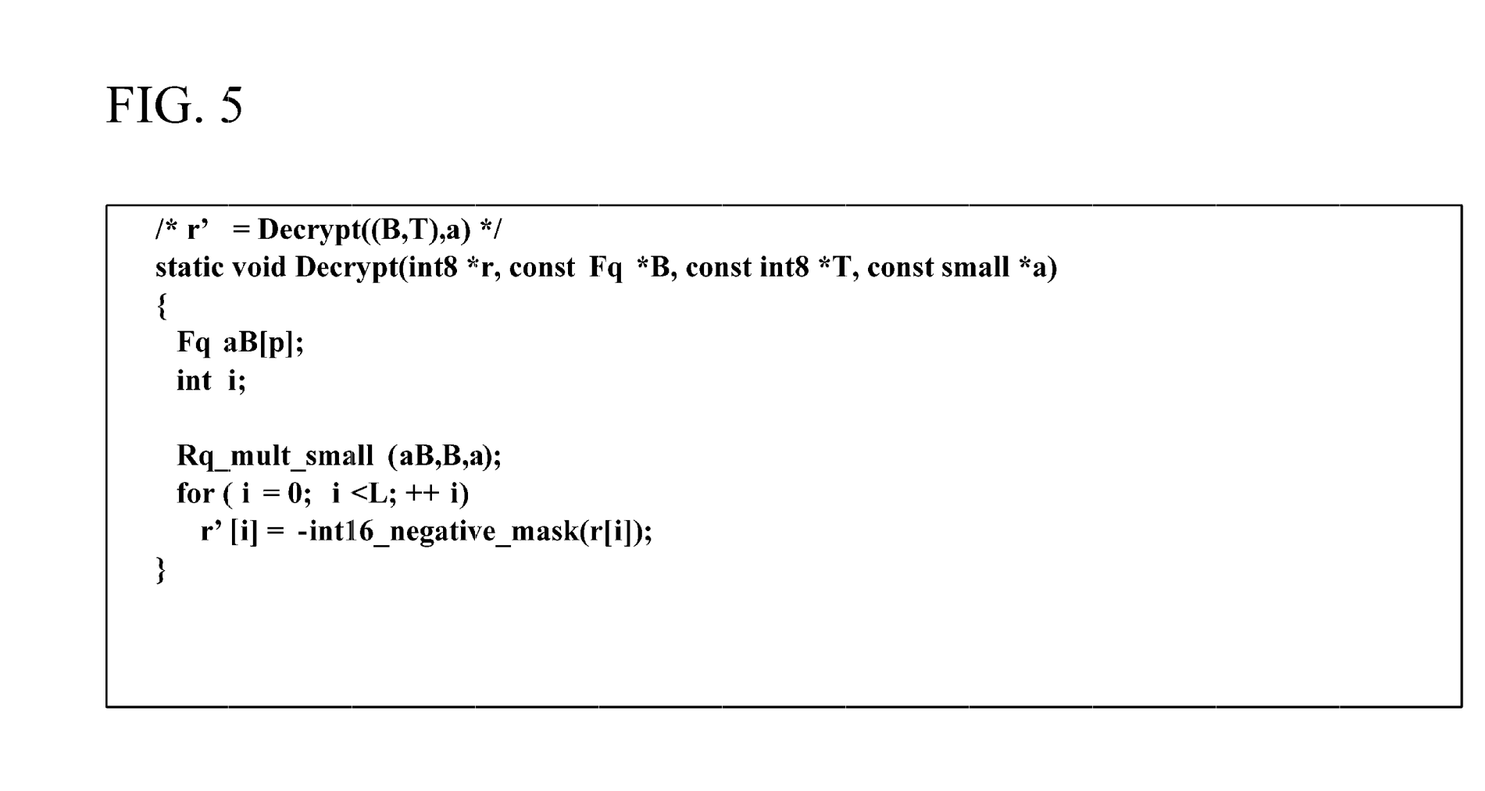
FIG. 5 is a diagram showing a source code implemented for executing a decryption algorithm shown in FIG. 4.
Figure 6:
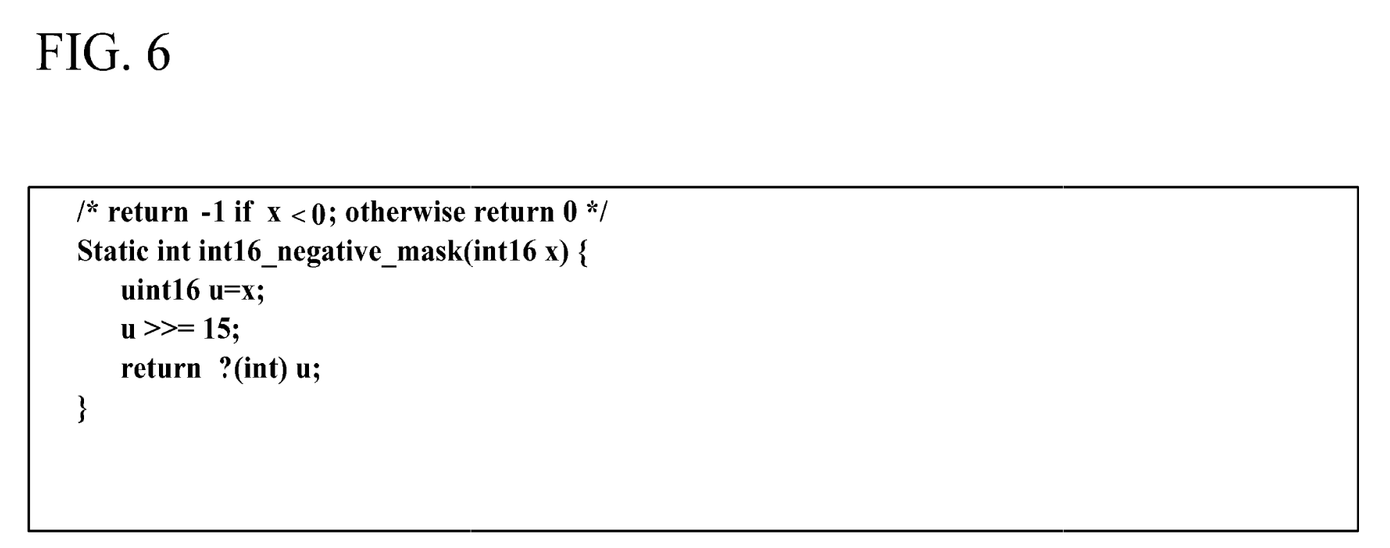
FIG. 6 is a diagram showing a source code implemented for executing a mask algorithm included in FIG. 5.

Meanwhile, FIG. 5 is a diagram illustrating a source code implemented for executing the decryption algorithm shown in FIG. 4, and FIG. 6 is a diagram showing a source code implemented for executing a mask algorithm included in FIG. 5.

Referring to FIGS. 5 and 6, when an output value that is generated using each bit $r_i$ (=r[i]) included in r=($r_0$, $r_1$, . . . , $r_{L-1}$)∈({0,1} as an input of the mask algorithm "int16_negative_mask" is −u, each bit value included in the secret information r'=r=(r'$_0$, r'$_1$, . . . , r'$_{L-1}$)∈{0,1} of L bits is r'$_i$=−(−u).

Meanwhile, in the examples shown in FIGS. 5 and 6, assuming that an attack position by a single trace attack is a position to which each bit value r'$_i$ of the secret information r' is returned using the mask algorithm and a power consumption model is dependent on Hamming weight (HW) information, the amount of power consumed when a median value is x is $P = \varepsilon \cdot HW(x) + P_{noise}$ (where $\varepsilon$ is a constant and $P_{noise}$ is noise). That is, the HW value of the median value and the power consumption have linearity.

That is, if int16_negative_mask(r[i])=0xffff, r'$_i$=1, and if int16_negative_mask(r[i])=0x0000, r'$_i$=0. Therefore, when r'$_i$=1, power consumption is proportional to 16 that is the HW value of the median value 0xffff, and when r'$_i$=0, power consumption is proportional to 0 that is the HW value of the median value 0x0000. Thus, the secret information r' can be exposed by a single trace attack.

Figure 7:
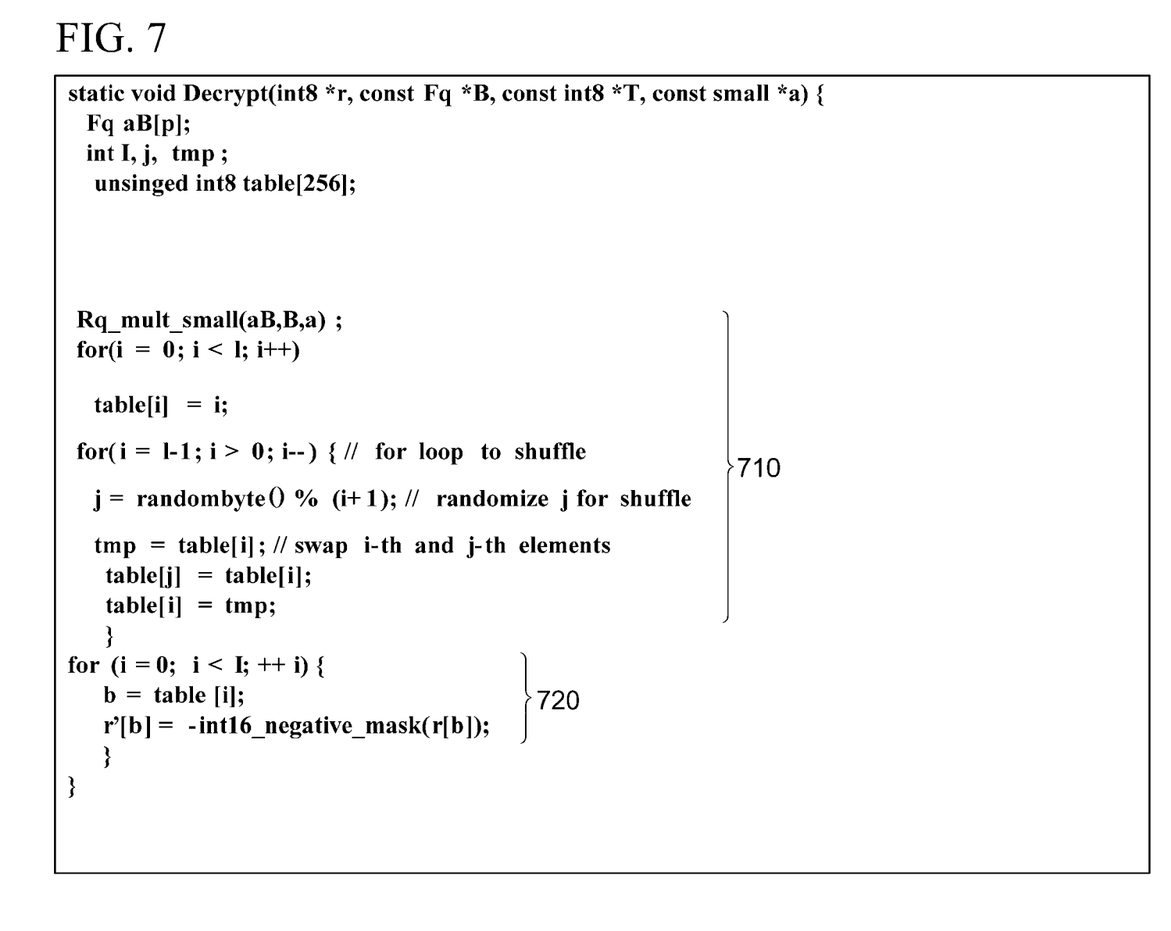
FIG. 7 is a diagram showing a source code of a decryption algorithm modified to allow a side-channel attack defense method to be applied thereto according to an embodiment.

Meanwhile, FIG. 7 is a diagram showing a source code of a decryption algorithm modified to allow a side-channel attack defense method to be applied thereto according to an embodiment.

Specifically, the source code shown in FIG. 7 is a source code obtained by modifying the source code shown in FIG. 5 so that an order table generation and shuffling process 710 is performed.

According to the source code shown in FIG. 7, an int_negative_mask calculation process 720 is performed so that a bit value of the secret information r' corresponding to each position index value is generated according to the sort order of each position index value in an order table generated through the order table generation and shuffling process 710.

That is, according to the source code shown in FIG. 7, since the bit values of the secret information r' are generated independently of each other in the int_negative_mask calculation process 720, it is possible to determine whether a currently generated bit value is "0" or "1" through a single-trace attack, but it is not possible to identify the position of the currently generated bit value in the bit string of r'. Therefore, in order to identify at which position the currently generated bit value is located in the bit string of r', an attack to determine a generation order for each bit value in the bit string of r' is additionally required, which increases the attack complexity.

While the present disclosure has been described in detail above with reference to representative exemplary embodiments, it should be understood by those skilled in the art that the exemplary embodiments may be variously modified without departing from the scope of the present disclosure. Therefore, the scope of the present disclosure is defined not by the described exemplary embodiments but by the appended claims and encompasses equivalents that fall within the scope of the appended claims.

What is claimed is:

1. A method for preventing side-channel attack performed by one or more hardware processors, the method comprising:
    generating an order table which includes a position index value for each bit value of a bit string that is secret information to be generated through a decryption algorithm of an Nth Degree Truncated Polynomial Ring Units (NTRU) LPRime algorithm, wherein the position index value for the each bit value indicates a position of the each bit value in the bit string;
    shuffling a sort order of the position index value for the each bit value in the order table based on a random number;
    determining a generation order for the each bit value according to the sort order of the position index value for the each bit value in the order table; and
    generating the bit string through the decryption algorithm, wherein the bit string is generated by generating the each bit value according to the determined generation order.

2. The method of claim 1, wherein the shuffling comprises:
    generating a random number $R_i$ for an i-th position index value included in the order table, wherein $R_i$ is an integer satisfying $0 \leq R_i$, i is the sort order and an integer number satisfying $1 \leq i \leq L-1$ and L is a length of the bit string;
    selecting a j-th position index value in the order table based on the i and the random number $R_i$, wherein j is an integer satisfying $0 \leq j \leq i$; and
    swapping the sort orders of the i-th position index value and the j-th position index value in the order table.

3. The method of claim 2, wherein the generating of the order table comprises generating the order table in which the position index value for the each bit value is arranged according to an order of the position of the each bit value in the bit string.

4. The method of claim 2, wherein the selecting comprises selecting the j-th position index value based on Equation 1:

$$j = R_i \bmod(i+1) \quad \text{[Equation 1]}$$

5. An apparatus for preventing side-channel attack, the apparatus comprising:
    a memory storing one or more commands; and
    one or more hardware processors configured to execute the one or more commands,
    wherein the one or more processors perform operations comprising:
    generating an order table which includes a position index value for each bit value of a bit string that is secret information to be generated through a decryption algorithm of an Nth Degree Truncated Polynomial Ring Units (NTRU) LPRime algorithm, wherein the position index value for the each bit value indicates a position of the each bit value in the bit string;
    shuffling a sort order of the position index value for the each bit value in the order table based on a random number;
    determining a generation order for the each bit value according to the sort order of the position index value for the each bit value in the order table; and
    generating the bit string through the decryption algorithm, wherein the bit string is generated by generating the each bit value according to the determined generation order.

6. The apparatus of claim 5, wherein the shuffling comprises:
    generating a random number $R_i$ for an i-th position index value included in the order table, wherein $R_i$ is an integer satisfying $0 \leq R_i$, i is the sort order and an integer number satisfying $1 \leq i \leq L-1$, and L is a length of the bit string;
    selecting a j-th position index value in the order table based on the i and the random number $R^i$, wherein j is an integer satisfying $0 \leq j \leq i$; and
    swapping the sort orders of the i-th position index value and the j-th position index value in the order table.

7. The apparatus of claim 6, wherein the generating of the order table comprises generating the order table in which the position index value for the each bit value is arranged according to an order of the position of the each bit value in the bit string.

8. The apparatus of claim 6, wherein the selecting comprises selecting the j-th position index value based on Equation 1:

$$j = R_i \bmod(i+1) \quad \text{[Equation 1]}$$

* * * * *